United States Patent
Daigo (10) Patent No.: US 8,841,887 B2
(45) Date of Patent: Sep. 23, 2014

(54) POWER SUPPLY DEVICE

(75) Inventor: Toru Daigo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 585 days.

(21) Appl. No.: 13/009,327

(22) Filed: Jan. 19, 2011

(65) Prior Publication Data

US 2012/0074897 A1    Mar. 29, 2012

(30) Foreign Application Priority Data

Sep. 24, 2010   (JP) .................................. 2010-213480

(51) Int. Cl.
*H02J 7/06*    (2006.01)
*H02J 7/24*    (2006.01)
*H02P 9/00*    (2006.01)
*H02J 7/14*    (2006.01)

(52) U.S. Cl.
CPC .............. *H02J 7/1461* (2013.01); *H02P 9/009* (2013.01); *Y02T 10/92* (2013.01)
USPC ......................................... 320/158; 320/162

(58) Field of Classification Search
USPC .......................................... 320/107, 158, 162
See application file for complete search history.

(56) References Cited

U.S. PATENT DOCUMENTS

| 3,558,985 | A | * | 1/1971 | Krolski et al. | ................... 361/61 |
| 8,415,929 | B2 | * | 4/2013 | Tabuta | ........................... 320/148 |
| 2011/0215754 | A1 | | 9/2011 | Tabuta et al. | |

FOREIGN PATENT DOCUMENTS

JP   11-225446 A   8/1999
WO   2010/073593 A   7/2010

OTHER PUBLICATIONS

Japanese Office Action dated Sep. 11, 2012, issued in JP Application No. 2010-213480.

* cited by examiner

*Primary Examiner* — Samuel Berhanu
(74) *Attorney, Agent, or Firm* — Sughrue Mion, PLLC (57) ABSTRACT

A power supply device capable of switching over semiconductor switches of a synchronous rectification means so as to efficiently charge up a battery in response to its charging status is provided. The device includes a switch control means for controlling the semiconductor switches in response to the battery charging status; a negative voltage detection means for detecting a negative voltage at each phase of three-phase AC voltages; and a voltage detection means for detecting the battery voltage being higher than a predetermined voltage, wherein when the negative voltage or the battery voltage higher than the predetermined voltage is detected, the switch control means controls the semiconductor switches. The device further includes an abnormality detection means for monitoring the negative voltage detected by the negative voltage detection means and thereby detecting an abnormality in at least one of the three phases, and when an abnormality is detected, the switch control means controls the semiconductor switch corresponding to the phase of the abnormality.

5 Claims, 10 Drawing Sheets

PRIOR ART

FIG. 9

POWER SUPPLY DEVICE

BACKGROUND OF THE INVENTION

1. Field of the Invention

The present invention relates to a power supply device that synchronously rectifies three-phase AC voltages and thereby charges up a battery.

2. Description of the Related Art

Figure 9:
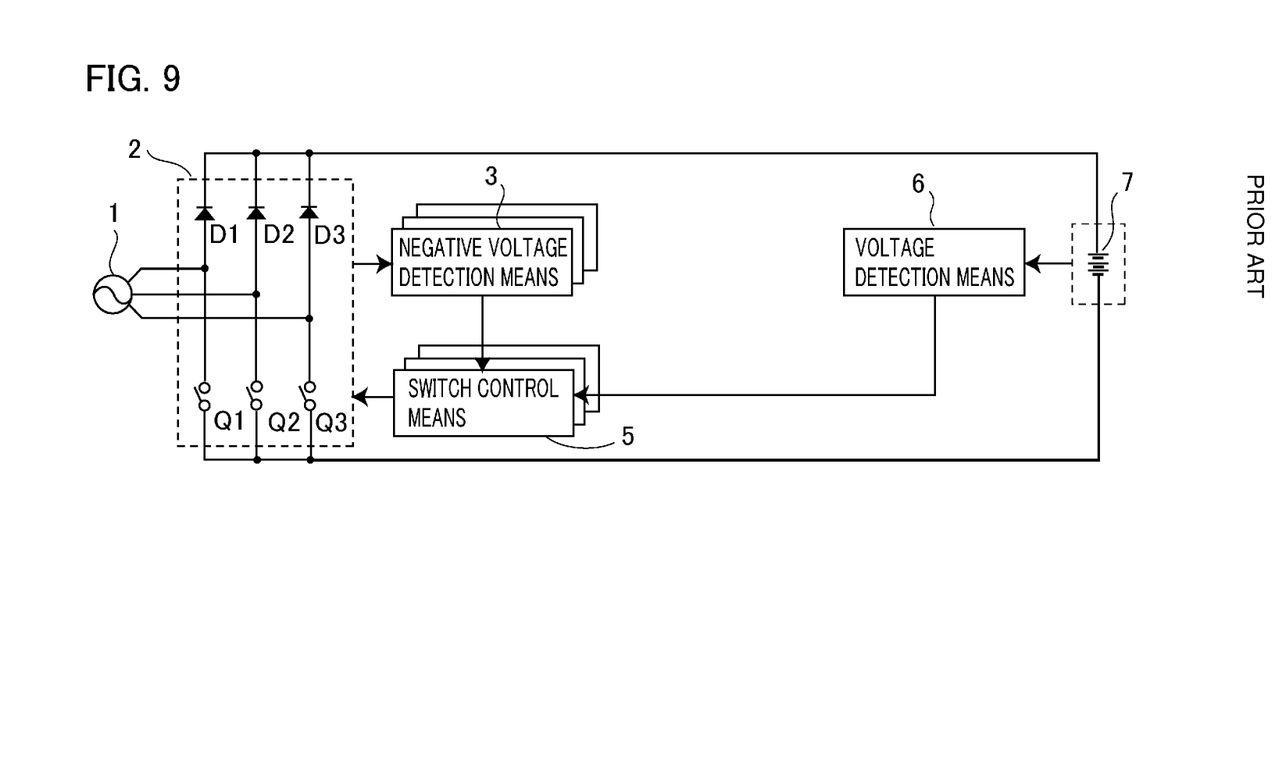
FIG. 9 is a block diagram showing the configuration of a conventional power supply device.

A conventional power supply device of this kind disclosed in, for example, Japanese Laid Open Patent No. H11-225446 (hereinafter referred to as Patent Document 1) is shown in FIG. 9, in which when the voltage of a battery 7 is low (the battery 7 is not fully charged up): more specifically, when a voltage detection means 6 detects that the battery voltage is lower than a predetermined voltage, thereby outputting no signal (referred to as a charge-permit state here), that is, when the battery is in this charge-permit state, a switch control means 5 outputs signals to semiconductor switches Q1 to Q3 so as to turn on each switch to become short-circuit during a period of a negative voltage detection means 3, which detects three-phase AC voltages generated by a generator 1 being negative, outputting signals.

Next, during a period of the negative voltage detection means 3, which detects the three-phase AC voltages generated by the generator 1 being negative, outputting no signal, the switch control means 5 outputs signals to semiconductor switches Q1 to Q3 so as to turn off each switch to become nonconductive. Therefore, the three-phase AC voltages from the generator 1 are synchronously rectified through diodes D1 to D3 and the semiconductor switches Q1 to Q3, and then the battery 7 is charged up with the rectified voltage.

Meanwhile, when the battery is fully charged up and its voltage is high enough: more specifically, when the voltage detection means 6 detects that the battery 7 voltage is higher than the predetermined voltage, outputting a signal (referred to as a charge-stop state here), the switch control means 5, in this charge-stop state, inputs its output signals to the respective semiconductor switches Q1 to Q3 at a time during a period of no current flowing through each of the three phases of the generator 1 (for example, during a period of the negative voltage detection means 3, which detects the three-phase AC voltages generated by the generator 1 being negative, outputting signals), whereby the semiconductor switches Q1 to Q3 are held in an ON state and made conductive until the charge-permit state begins. Therefore, in the charge-stop state, regardless of the three-phase AC voltages output from the generator 1 being positive or negative, the semiconductor switches Q1 to Q3 become conductive, so that the battery is put into a non-charging state. For a while afterward, the non-charging state is continued. When the battery voltage becomes lower than the predetermined voltage, the same operations as those in the charge-permit state are repeated.
Patent Document 1: Japanese Laid Open Patent No. H11-225446

Figure 10:
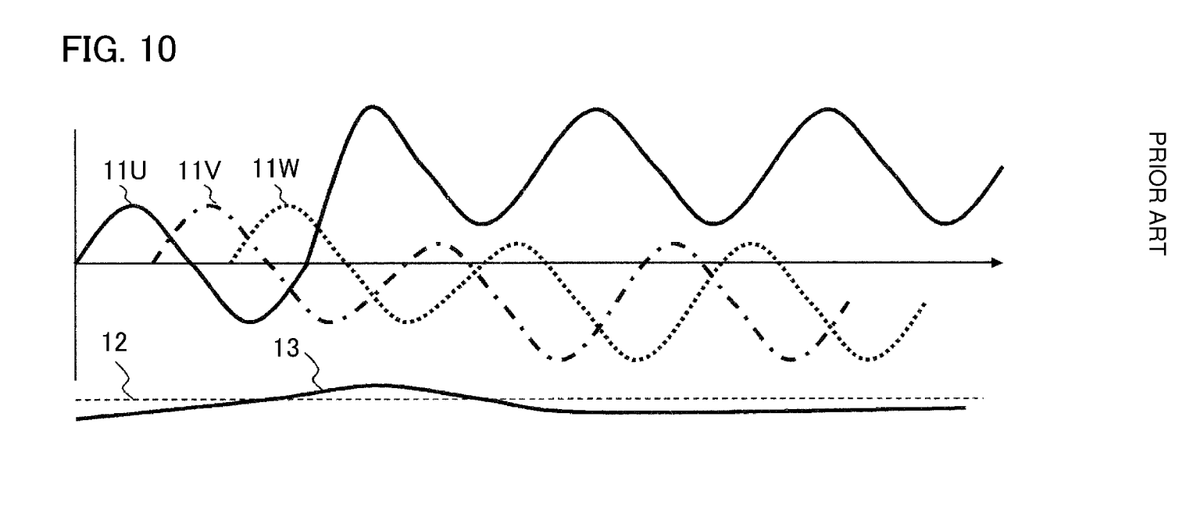
FIG. 10 is a waveform diagram showing output voltages from the generator and the battery shown in FIG. 9.

In FIG. 10, in the charge-stop state where a battery voltage 13 is higher than a predetermined voltage 12, the semiconductor switches Q1 to Q3 are made conductive at a time during the period of no current flowing through each of the three phases of the generator 1 (for example, during a period of the negative voltage detection means 3, which detects the three-phase AC voltages generated by the generator 1 being negative, outputting signals), and continue to stay in the conductive state, thereby short-circuiting also the following positive voltages; therefore, the voltage of a phase whose voltage has been short-circuited earlier than the other phases becomes higher than those of the other phases, which causes, as shown in FIG. 10, voltage imbalance between the three-phase AC voltages 11U, 11V and 11W output from the generator 1.

Then, by making the semiconductor switches Q1 to Q3 conductive, the battery voltage 13 is lowered, putting the battery into the charge-permit state, whereby the switch control means 5, during a period of each of the AC voltages being negative, turns on their respective semiconductor switches Q1 to Q3 to become conductive so as to resume synchronous rectification, and then charging up of the battery 7 starts. However, the voltage imbalance between the three phases that has arisen during the charge-stop state continues for several periods immediately after the state changing from the charge-stop to charge-permit state; therefore, in a phase that has been firstly short-circuited, a negative voltage sometimes cannot be detected for these several periods. If the charging up starts without detecting the negative voltage, a phase in which the negative voltage cannot be detected cannot be short-circuited, and furthermore, the voltage at the phase in which the negative voltage cannot be detected stays high making it unable to detect a negative voltage because the charging up of the battery has already started. The switch corresponding to the phase in which the negative voltage cannot be detected is continuously held conductive, thereby causing problems in that the semiconductor switch is broken down precluding the synchronous rectification, so that the battery 7 cannot be charged up.

SUMMARY OF THE INVENTION

The present invention has been made aiming at solving the problems described above and obtaining a power supply device, in which three-phase AC voltages can be changed into substantially stable ones excluding voltage imbalance between three phases that arises when a positive voltage of only one of the three phases is short-circuited earlier than the others immediately after a charge-stop state of a battery ending, and synchronous rectification is performed by switching over, with proper timing, the states of semiconductor switches Q1 to Q3 constituting the rectification means, so that the battery can be efficiently charged up.

A power supply device according to the present invention includes a rectification means for synchronously rectifying three-phase AC voltages generated by a generator so as to produce a charging voltage for charging up a battery; a switch control means for controlling each of semiconductor switches, constituting the rectification means, at intervals in response to the charging status of the battery; a negative voltage detection means for detecting a negative voltage at each of three phases of the three-phase AC voltages; and a voltage detection means for detecting the battery voltage being higher than a predetermined voltage, wherein when the negative voltage or the battery voltage higher than the predetermined voltage is detected, the switch control means controls each of the semiconductor switches. The power supply device further includes an abnormality detection means for monitoring the status of the negative voltage at each phase detected by the negative voltage detection means and thereby detecting an abnormality in at least one of the three phases, wherein when an abnormality is detected by the abnormality detection means, the means through the switch control means controls the semiconductor switch corresponding to the phase of the abnormality.

According to the present invention, even when the battery voltage is higher than the predetermined voltage, imbalance arises between three phase AC voltages output from the generator immediately after a charge-stop state ending and the negative voltage detection means therefore cannot detect a negative voltage at any of the phases, the switch control means controls the semiconductor switch corresponding to the phase to continue to be conductive until a negative voltage can be detected, whereby the voltage imbalance between the three phase AC voltages output from the generator is corrected, and the three phase AC voltages are synchronously rectified, enabling the battery to be charged up with the rectified DC voltage.

Therefore, a critical situation in which voltage imbalance between the three-phase voltages arises, making a semiconductor switch of only one particular phase be continuously conductive so as to break it down, and as a result, the battery 7 cannot be up charged can be prevented from happening, whereby the battery can be efficiently charged up.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
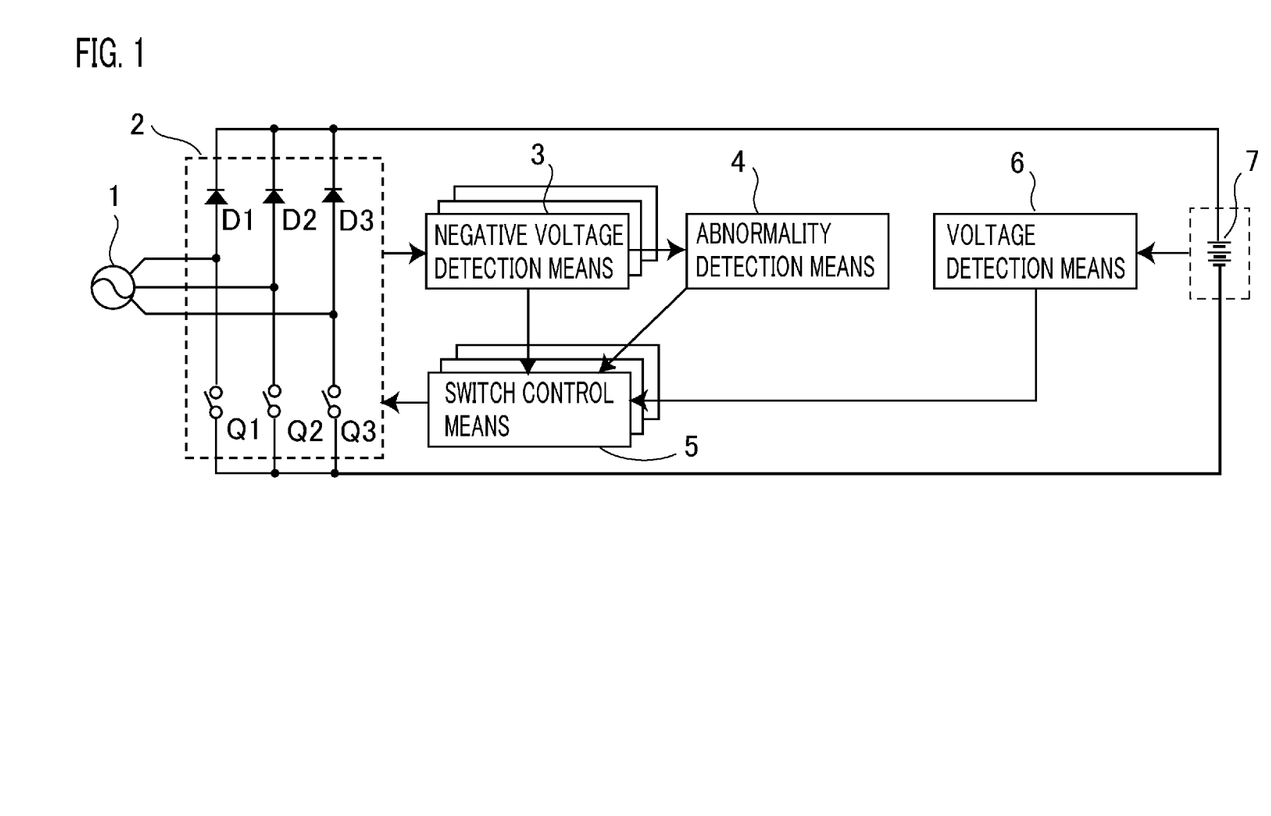
FIG. 1 is a block diagram showing the configuration of a power supply device according to Embodiment 1 of the present invention.
Figure 2:
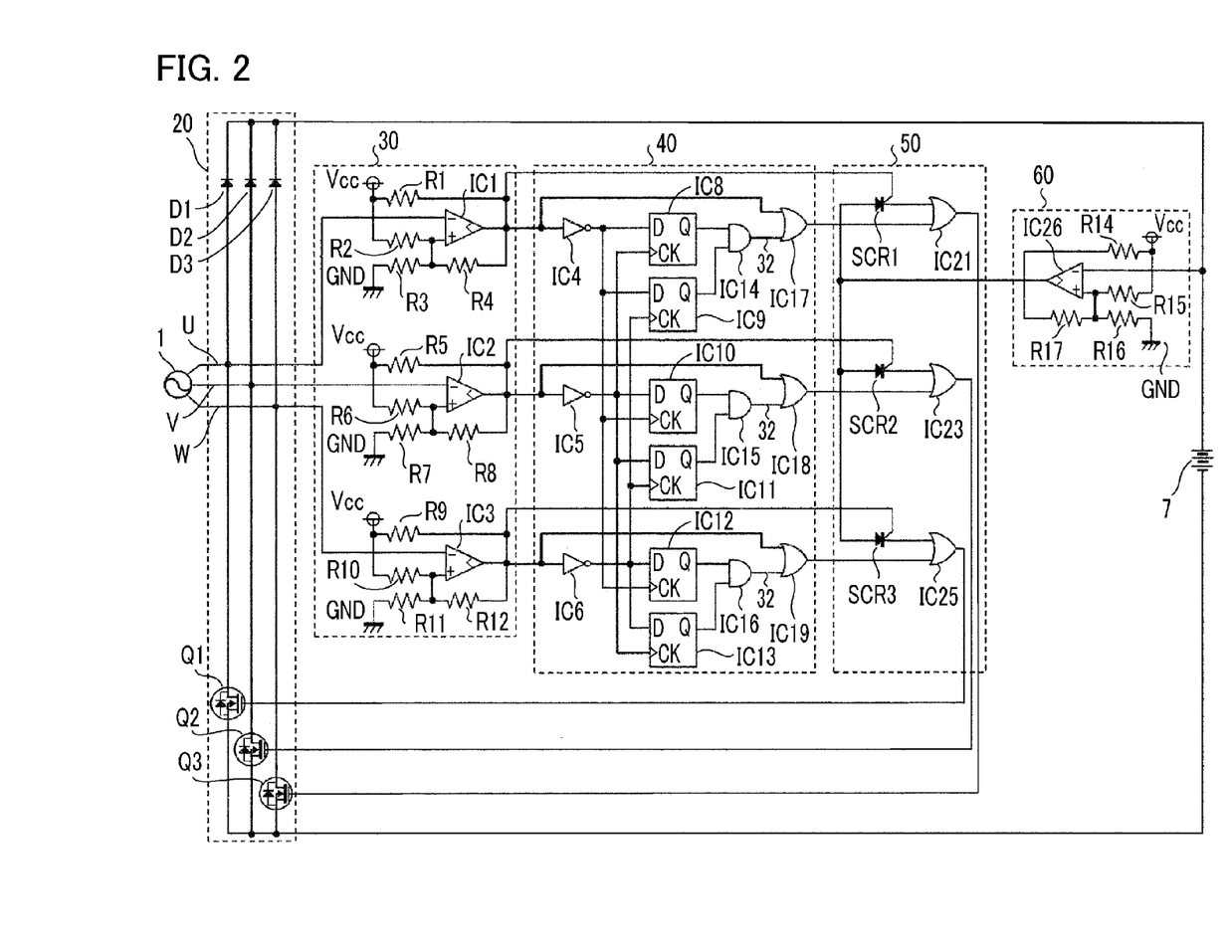
FIG. 2 is a circuit diagram showing the configuration of the power supply device according to Embodiment 1 of the invention.

FIG. 1 is a block diagram showing the configuration of a power supply device according to Embodiment 1 of the present invention; FIG. 2 is a circuit diagram showing a specific configuration thereof.

A power supply device according to Embodiment 1 of the present invention includes a rectification means 2 for synchronously rectifying three-phase AC voltages generated by a generator 1 so as to produce a charging voltage for charging up a battery 7; a switch control means 5 for controlling each of semiconductor switches Q1 to Q3, constituting the rectification means 2, at intervals in response to the charging status of the battery 7; a negative voltage detection means 3 for detecting a negative voltage at each phase of the three-phase AC voltages; and a voltage detection means 6 for detecting the battery voltage being higher than a predetermined voltage, wherein the switch control means 5 controls each of the semiconductor switches Q1 to Q3 when the negative voltage or the battery voltage higher than the predetermined voltage is detected. The power supply device further includes an abnormality detection means 4 for monitoring the status of the negative voltage at each phase detected by the negative voltage detection means 3 and thereby detecting an abnormality in at least one of the three phases, wherein when an abnormality is detected by the abnormality detection means 4, the abnormality detection means controls through the switch control means 5 the semiconductor switch, among the semiconductor switches Q1 to Q3, corresponding to the phase of the abnormality.

In FIG. 1 and FIG. 2, the generator 1 generates the three-phase AC voltages including U-phase, V-phase and W-phase so as to charge up the battery 7.

A rectification circuit 20 constituting the rectification means 2 includes for each phase a diode D1 and a semiconductor switch Q1, a diode D2 and a semiconductor switch Q2, and a diode D3 and a semiconductor switch Q3. The anode of the diode D1 and the semiconductor switch Q1 are connected to U-phase of the generator 1, the anode of the diode D2 and the semiconductor switch Q2 to V-phase, and the anode of the diode D3 and the semiconductor switch Q3 to W-phase. The cathodes of diodes D1 to D3 are connected together to the positive electrode of the battery 7, and the semiconductor switches Q1 to Q3 are connected together to the negative electrode thereof.

A negative voltage detection circuit 30 constituting the negative voltage detection means 3 includes, corresponding to each phase, a comparator made up of resisters R1 to R12 and operational amplifiers IC1 to IC3. The input terminal of each comparator is connected to corresponding output terminals of the generator 1; the output terminal of each comparator is connected to the input terminal of corresponding phases of an abnormality detection circuit 40 constituting the abnormality detection means 4 and also to the input terminal of corresponding phases of a switch control circuit 50 constituting the switch control means 5.

The abnormality detection circuit 40 constituting the abnormality detection means 4 includes inverters IC4 to IC6, D-flip-flops IC8 to IC13, AND gates IC14 to IC16 and OR gates IC17 to IC19.

The input terminal of the inverter IC4 is connected to the U-phase output terminal of the negative voltage detection circuit 30 and an input terminal of the OR gate IC17; the input terminal of the inverter IC5 is connected to the V-phase output terminal of the negative voltage detection circuit 30 and an input terminal of the OR gate IC18; and the input terminal of the inverter IC6 is connected to the W-phase output terminal of the negative voltage detection circuit 30 and an input terminal of the OR gate IC19.

The output terminal of the inverter IC4 is connected to the data terminals of the D-flip-flops IC8 and IC9 and the clock terminals of the D-flip-flops IC10 and IC12; the output terminal of the inverter IC5 is connected to the data terminals of the D-flip-flops IC10 and IC11 and the clock terminals of the D-flip-flops IC8 and IC13; and the output terminal of the inverter IC6 is connected to the data terminals of the D-flip-flops IC12 and IC13 and the clock terminals of the D-flip-flops IC9 and IC11.

Moreover, the input terminals of the AND gate IC14 are connected to the output terminals of the D-flip-flops IC8 and IC9; the input terminals of the AND gate IC15 are connected to the output terminals of the D-flip-flops IC10 and IC11; and the input terminals of the AND gate IC16 are connected to the output terminals of the D-flip-flops IC12 and IC13.

Moreover, the input terminals of the OR gate IC17 are connected to the input terminal of the inverter IC4 and the output terminal of the AND gate IC14; the input terminals of the OR gate IC18 are connected to the input terminal of the inverter 105 and the output terminal of the AND gate IC15; and the input terminals of the OR gate IC19 are connected to the input terminal of the inverter 106 and the output terminal of the AND gate IC16.

The switch control circuit 50 constituting the switch control means 5 includes thyristors SCR1 to SCR3 and OR gates IC21, IC23 and IC25. The gate of the thyristor SCR1 is connected to the U-phase output terminal of the negative voltage detection circuit 30; the anode of the thyristor SCR1 is connected to a comparator of the voltage detection circuit 60; the gate of the thyristor SCR2 is connected to the V-phase output terminal of the negative voltage detection circuit 30; the anode of the thyristor SCR2 is connected to the comparator of the voltage detection circuit 60; the gate of the thyristor SCR3 is connected to the W-phase output terminal of the negative voltage detection circuit 30; and the anode of the thyristor SCR3 is connected to the comparator of the voltage detection circuit 60.

Moreover, the input terminals of the OR gate IC21 are connected to the cathode of the thyristor SCR1 and the U-phase output terminal of the abnormality detection circuit 40; the input terminals of the OR gate IC23 are connected to the cathode of the thyristor SCR2 and the V-phase output terminal of the abnormality detection circuit 40; and the input terminals of the OR gate IC25 are connected to the cathode of the thyristor SCR3 and the W-phase output terminal of the abnormality detection circuit 40.

The voltage detection circuit 60 constituting the voltage detection means 6 is made of the comparator including resisters R14 to R17 and an operational amplifier IC26, which is connected to the positive electrode of the battery 7 and the thyristors SRC1 to SRC3 of the switch control circuit 50.

The operation of the power supply device as configured above will be explained referring to three-phase AC voltages 11U, 11V and 11W output from the generator 1; a predetermined voltage 12; a battery voltage 13; output 14 from the voltage detection circuit 60; U-phase output 15, V-phase output 16 and W-phase output 17 from the negative voltage detection circuit 30; output 18 from the abnormality detection circuit 40; and input 19 to the semiconductor switch Q1, shown in FIG. 3.

Figure 3:
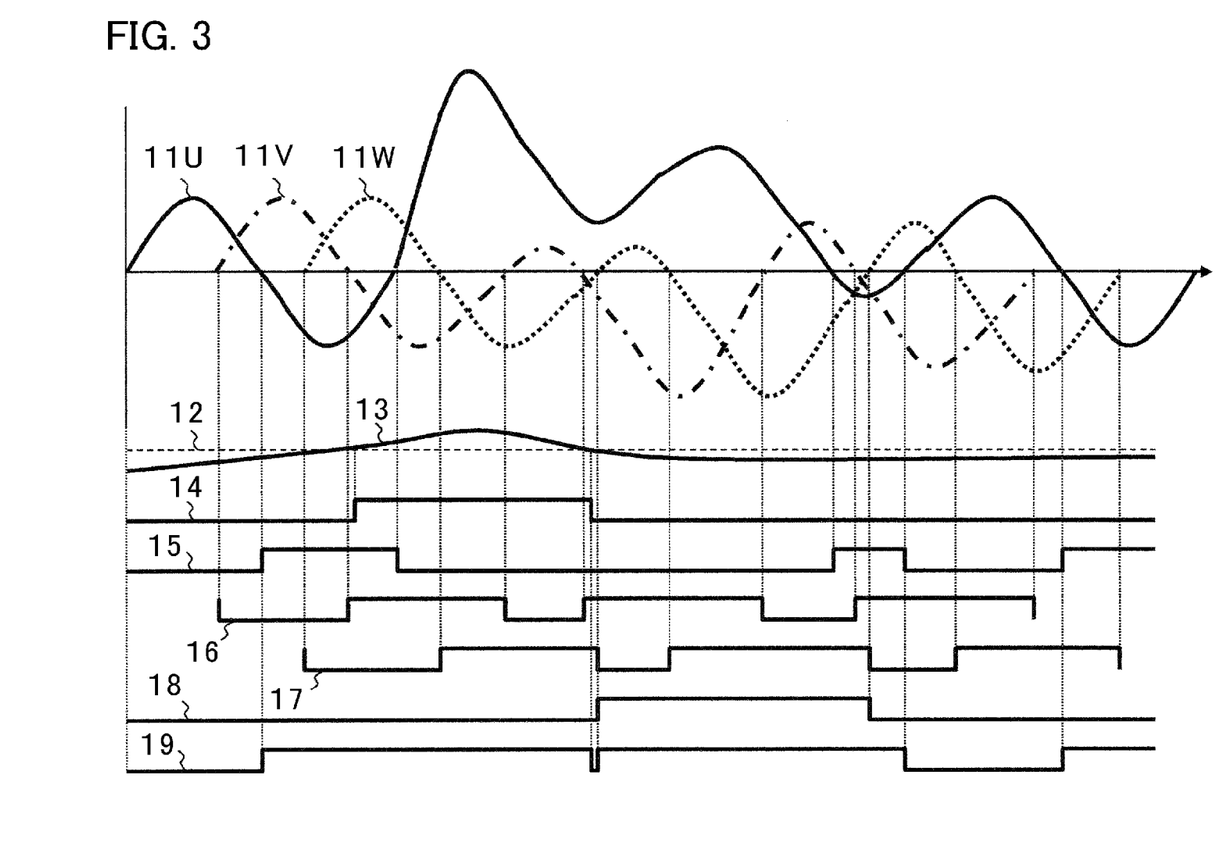
FIG. 3 is a waveform diagram showing output voltages from a generator and circuits each according to Embodiment 1 of the invention.

Given that a positive voltage at U-phase, for example, is firstly short-circuited in a charge-stop state where the battery voltage 13 is higher than the predetermined voltage 12.

The U-phase semiconductor switch Q1 is conventionally controlled by the switch control circuit 50 only outputting to the switch Q1 the result of performing logical OR (logical sum) operation of the U-phase output 15 from the negative voltage detection circuit 30 and the output 14 from the voltage detection circuit 60; therefore, even when a U-phase generation voltage is high, if the battery goes into a charge-permit state, its charging immediately starts, and the voltage at only the U-phase continues to stay high, so that a negative voltage cannot be detected, making the semiconductor switch Q1 unable to become conductive.

Here in the abnormality detection circuit 40, the U-phase output 15 and the V-phase output 16 from the negative voltage detection circuit 30, which detects the three-phase AC voltages 11U, 11V and 11W output from the generator 1 being negative, are inverted by inverters, logical AND (logical product) operation of those inverted output voltages is performed at the rising edges thereof, and in addition, the U-phase output 15 and the W-phase output 17 from the negative voltage detection circuit 30 are inverted by inverters, and then logical AND operation of those inverted output voltages is performed at the rising edges thereof, followed by logical AND operation of the two AND operation results. Then, this AND operation result is input to the switch control circuit 50 as the output 18 from the abnormality detection circuit 40. The switch control circuit 50 performs logical OR operation of the output 15 from the negative voltage detection circuit 30 and the output 14 from the voltage detection circuit 60, and then inputs its output 19 to the semiconductor switch Q1 so as to turn it on.

Therefore, even when the battery voltage 13 is lower than the predetermined voltage 12 and the battery takes on the charge-permit state, U-phase remains in a short-circuited state until a negative voltage can be detected, whereby the U-phase voltage 11U is lowered. If a negative voltage becomes ready to be detected, voltage imbalance between the three-phase AC voltages 11U, 11V and 11W output from the generator 1 is corrected enabling synchronous rectification, so that the battery can be efficiently charged up with the rectified voltage.

Embodiment 2

In Embodiment 2 of the present invention, another abnormality detection method is implemented in the power supply device shown in FIG. 1 according to Embodiment 1 of the invention, in which sequence of detecting negative voltages at the three phases is monitored, and when an abnormality in the sequence of detecting the negative voltages is detected, the phase corresponding to the abnormality is determined to be in an abnormal state.

FIG. 4 to FIG. 7 show flowcharts for the negative voltage detection means 3, the abnormality detection means 4, the voltage detection means 6 and the switch control means 5 in FIG. 1, respectively.

Figure 4:
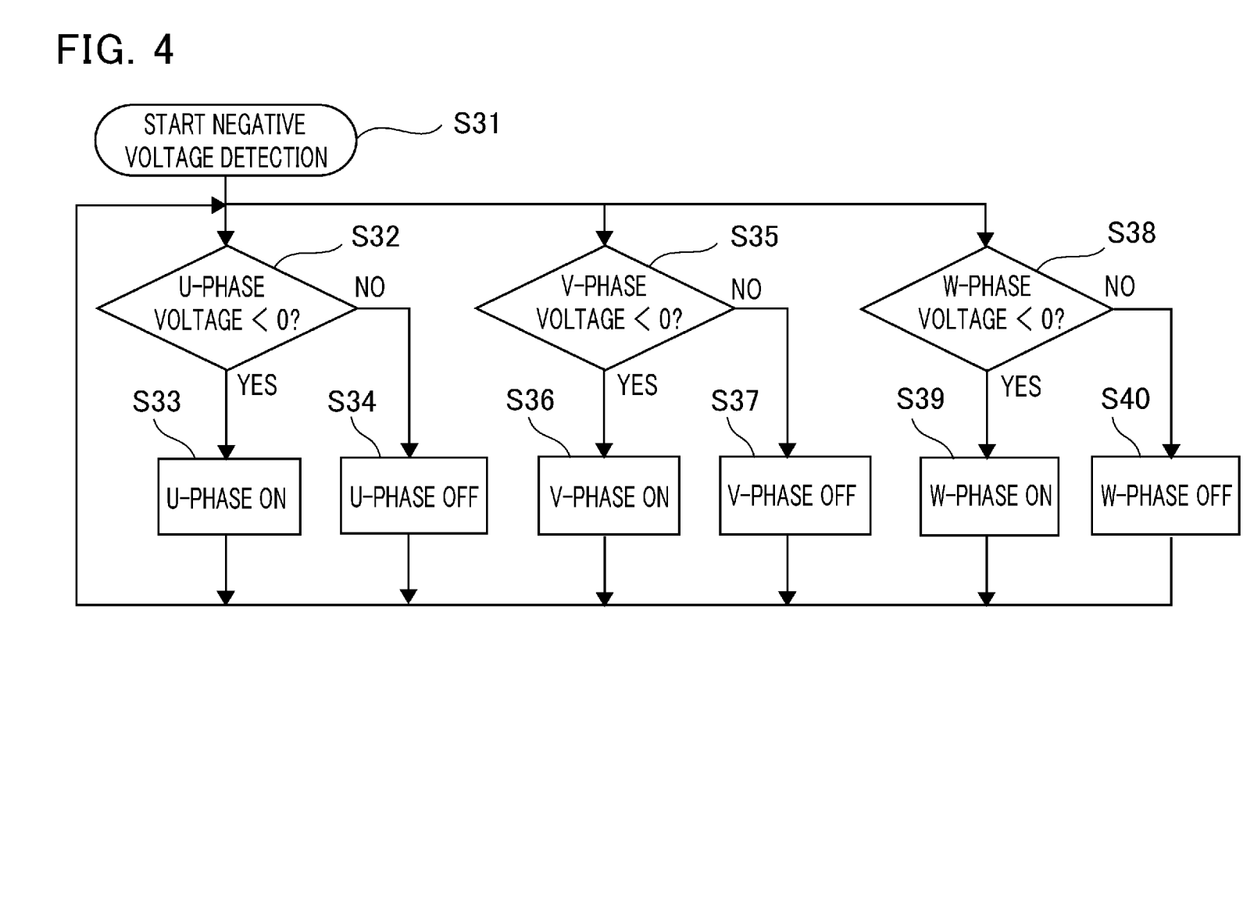
FIG. 4 is a flowchart for a negative voltage detection means according to Embodiment 2 of the invention.

As shown in FIG. 4, the negative voltage detection means 3 determines phase by phase whether or not each voltage from the generator 1 is lower than zero, and if so, then turns on the switch corresponding to the phase, whereas if not lower than zero, turns off the switch (Steps S31 to S40).

Figure 5:
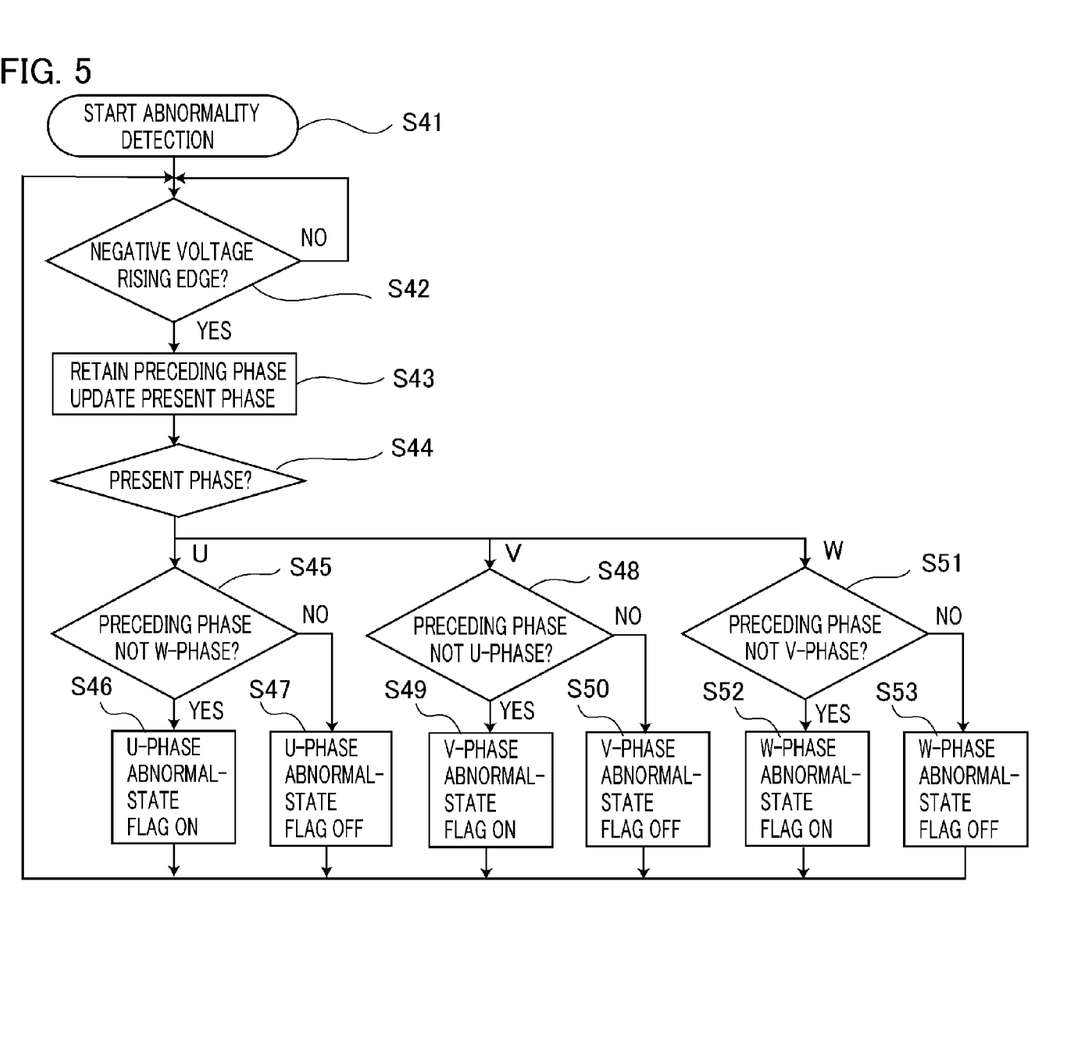
FIG. 5 is a flowchart for an abnormality detection means according to Embodiment 2 of the invention.

Moreover, the abnormality detection means 4, as shown in the flowchart in FIG. 5, firstly detects a rising edge of an output voltage at each phase from the negative voltage detection means 3 (Steps S41 and 42). Next, the detection means 4 retains the preceding phase information without being overwritten, and updates information on a phase whose rising edge is input at the present moment (Step S43), followed by determination as to which phase among the three phases the input rising edge belongs to. By comparing the updated information on each phase with its preceding information, the abnormality detection means determines whether or not the sequence is correct. The determination is made by determining whether or not a phase whose rising edge is presently input follows its predetermined preceding phase, that is, whether or not the preceding phase is W-phase, if the phase whose rising edge is presently input is U-phase, whether or not the preceding phase is U-phase, if it is V-phase, and whether or not the preceding phase is V-phase, if it is W-phase. If the preceding phase is not the predetermined one, determination is made that the sequence is incorrect, and then each phase is informed of an abnormal state. Meanwhile, if the preceding phase is the predetermined one, determination is made that the sequence is correct, and then the abnormal state is canceled. If the first input is not the rising edge of the output at each phase from the negative voltage detection means 3, abnormality detection is not made (Steps S44 to S53).

Figure 6:
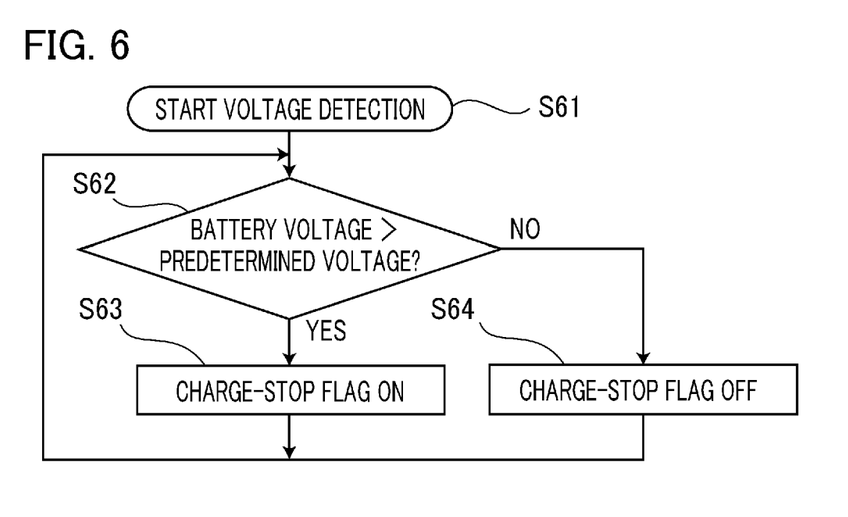
FIG. 6 is a flowchart for a voltage detection means according to Embodiment 2 of the invention.

Moreover, the voltage detection means 6, as shown in the flowchart in FIG. 6, determines that the battery is in the charge-stop state when the battery 7 voltage is higher than the predetermined voltage, whereas when it is not higher than the predetermined voltage, cancels the charge-stop state (the charge-permit state) (Steps S61 to S64).

Figure 7:
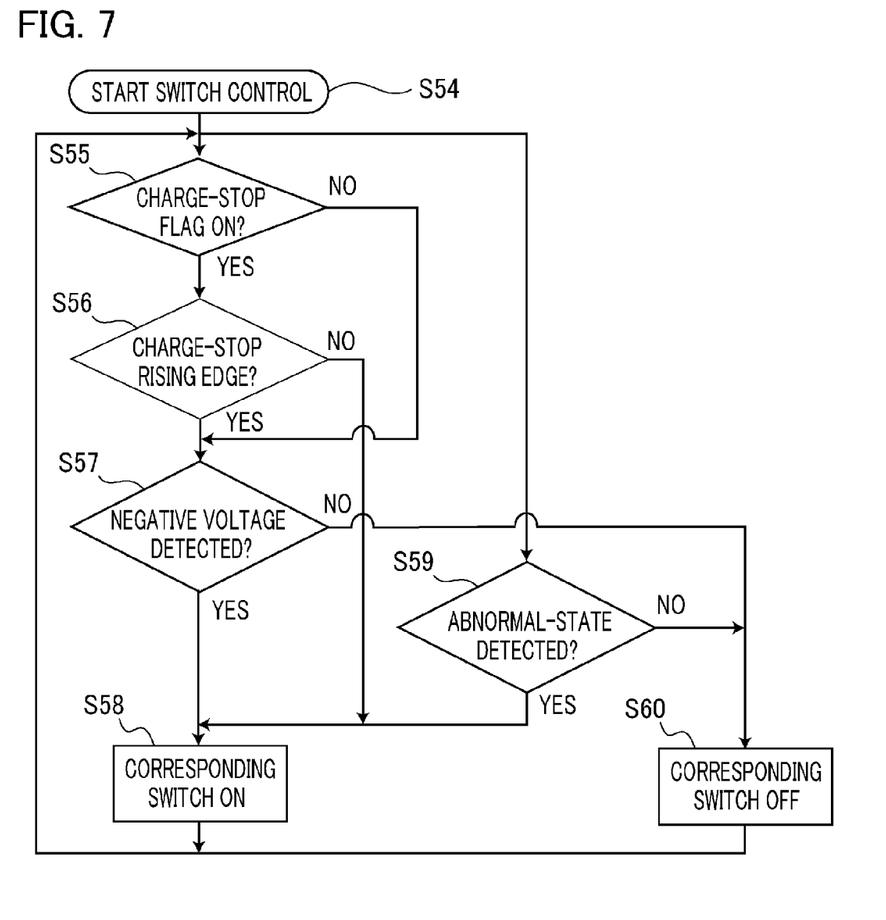
FIG. 7 is a flowchart for a switch control means according to Embodiment 2 of the invention.

Furthermore, the switch control means 5, as shown in the flowchart in FIG. 7, firstly determines whether or not the battery is in the charge-stop state according to the battery voltage status detected by the voltage detection means 6 (Steps S54 and S55). If the battery is in the charge-stop state, rising edges are detected at each phase (Step S56).

If a rising edge is detected, whether or not a negative voltage is output from each phase is determined next. If a negative voltage is detected, the semiconductor switch corresponding to the phase is turned on, whereas if no negative voltage is detected, the corresponding semiconductor switch is turned off. Meanwhile, if no rising edge is detected, the corresponding semiconductor switch is turned on. When the battery is not in the charge-stop state, whether or not a negative voltage is output from each phase is determined. In addition, when the switch control processing starts, determination is made as to whether or not each phase is in an abnormal state (Step S59). If any phase is in the abnormal state, the corresponding semiconductor switch is turned on, whereas not in the abnormal state, the corresponding semiconductor switch is turned off (Steps S57 to S60).

According to Embodiment 2 of the present invention as described above, even if voltage imbalance between the three phases arises as shown in FIG. 3, so that a negative voltage cannot be detected at only a particular phase, by monitoring the sequence of detecting negative voltages and, when an abnormality is detected, by turning on the corresponding semiconductor switch, the voltage at the phase corresponding to the abnormality is lowered, whereby voltage imbalance between the three phase AC voltages output from the generator 1 is corrected, synchronous rectification is made possible, and as a result, the battery 7 can be efficiently charged up with the rectified voltage.

Embodiment 3

In Embodiment 3 of the present invention, still another abnormality detection method is implemented in the power supply device shown in FIG. 1 according to Embodiment 1 of the invention, in which if a negative voltage fails to be detected at each of the three phases at a predetermined time, the phase corresponding to the failure is determined to be in an abnormal state, and controlling of the semiconductor switch corresponding to the phase is continued until a negative voltage is detected.

Figure 8:
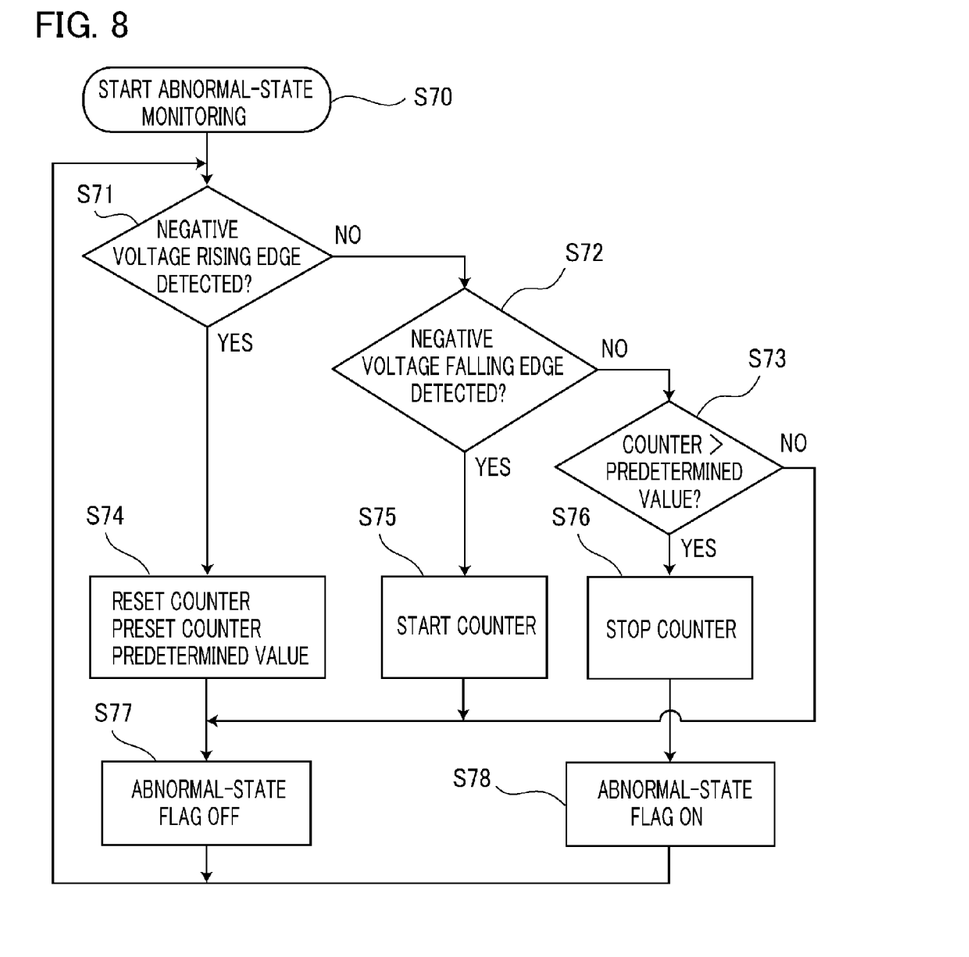
FIG. 8 is a flowchart for an abnormality detection means according to Embodiment 3 of the invention.

The operation of the abnormality detection means 4 will be explained referring to the flowchart in FIG. 8.

The abnormality detection means 4 detects a rising edge of an output voltage from each phase of the negative voltage detection means 3 (Steps S70 and S71). If a rising edge is detected, its counter is reset and then a predetermined value is preset in the counter (Step S74). When presetting the predetermined value in the counter, the value can be adjusted in accordance with the generation frequency of the generator 1. When the generation frequency is high, that is, the rotation speed of an engine is high, the counter value can be made shorter (smaller), whereas when the speed is low, it can be made longer (larger). Then, the abnormality state is canceled afterward (Step S77).

If no rising edge is detected, the abnormality detection means 4 detects a falling edge instead (Step S72). When a falling edge is detected, it activates the counter to start counting (Step S75). That is to say, in these steps, the abnormality detection means 4 determines whether or not a positive voltage is detected within the predetermined value (the predetermined time). After that, the abnormality state is canceled. If no falling edge is detected, determination is made based on a counter value (Step S73). If the counter value is greater than the predetermined value, the abnormality detection means determines that a negative voltage cannot be detected and a positive voltage continues accordingly, stops the counter, and then informs the switch control means of an abnormal state. Meanwhile, if the counter value is less than the predetermined value, it cancels the abnormality state (Steps S76 to S78).

This processing is carried out independently phase by phase, the same processing is carried out on the other phases, and their abnormal state is reported to the switch control means 5.

According to Embodiment 3 of the present invention, as described above, even when a state happens where voltage imbalance arises between the three phases as shown in FIG. 3 and therefore a negative voltage cannot be detected at only one of the phases, the abnormality detection means monitors whether or not a negative voltage is detected within the predetermined time, and if an abnormality occurs, the semiconductor switch corresponding to the phase of the abnormality is turned off, thereby lowering the voltage at the abnormal phase. As a result, voltage imbalance between the three phase AC voltages output from the generator 1 is corrected, and synchronous rectification is made possible, so that the battery 7 can be efficiently charged up with the rectified voltage.

Therefore, a critical situation in which voltage imbalance between the three-phase AC voltages arises, making the semiconductor switch of only one particular phase continuously conductive so as to break down the switch, and as a result, the battery 7 cannot be charged up can be prevented from arising, whereby the battery can be charged up efficiently.

Various modifications and alterations of this invention will be apparent to those skilled in the art without departing from the scope and spirit of this invention, and it should be understood that this is not limited to the illustrative embodiments set forth herein.

What is claimed is:

1. A power supply device including a rectification means for synchronously rectifying three-phase AC voltages generated by a generator so as to produce a charging voltage for charging up a battery; a switch control means for controlling each of semiconductor switches, constituting the rectification means, at intervals in response to a charging status of the battery; a negative voltage detection means for detecting a negative voltage at each of three phases of the three-phase AC voltages; and a voltage detection means for detecting the battery voltage being higher than a predetermined voltage, wherein when the negative voltage or the battery voltage higher than the predetermined voltage is detected, the switch control means controls each of the semiconductor switches, the power supply device comprising:

an abnormality detection means for monitoring a status of the negative voltage at each phase detected by the negative voltage detection means and thereby detecting an abnormality in at least one of the three phases; wherein when the abnormality detection means detects an abnormality in the negative voltage of a phase, the abnormality detection means through the switch control means controls only a semiconductor switch, among the semiconductor switches, which corresponds to the phase of the abnormality.

2. A power supply device according to claim 1, wherein when the abnormality detection means detects a state where when a voltage at one particular phase among the three phases is not negative, voltages of both of the other phases are negative, the abnormality detection means determines that the particular phase is in an abnormal state.

3. A power supply device according to claim 1, wherein the abnormality detection means monitors sequence of detecting negative voltages at the three phases, and when the abnormality detection means detects an abnormality in the sequence of detecting the negative voltages, the means determines that a phase corresponding to the abnormality is in an abnormal state.

4. A power supply device according to claim 1, wherein when the abnormality detection means fails to detect a negative voltage at a predetermined time at each of the three phases, the abnormality detection means determines that a phase corresponding to the failure is in an abnormal state, and controlling of a semiconductor switch, among the semiconductor switches, corresponding to the phase is continued for a time until a negative voltage is detected.

5. A power supply device according to claim 1, wherein the rectification means includes for each phase a diode and a semiconductor switch among the semiconductor switches, the anode of the diode and the semiconductor switch are connected together to each phase of the generator, the cathode of the diode is connected to the positive electrode of the battery, and the semiconductor switch is connected to the negative electrode of the battery, and in addition, when the abnormality detection means detects an abnormality, the abnormality detection means through the switch control means turns on a semiconductor switch, among the semiconductor switches, corresponding to a phase of the abnormality.

* * * * *